United States Patent [19]

Romanet et al.

[11] Patent Number: 4,752,860
[45] Date of Patent: Jun. 21, 1988

[54] HIGH VOLTAGE METALLIC SUBSTATION HAVING ONE AND A HALF CIRCUIT BREAKERS PER FEED

[75] Inventors: Philippe Romanet, St. Martin D'Heres; André Giboulet, St. Egreve, both of France

[73] Assignee: Merlin Gerin, France

[21] Appl. No.: 762,422

[22] Filed: Aug. 5, 1985

[30] Foreign Application Priority Data

Aug. 24, 1984 [FR] France .................... 84 13277

[51] Int. Cl.⁴ .............................................. H02B 1/04
[52] U.S. Cl. ....................................... 361/333; 361/335; 361/341
[58] Field of Search ............... 361/333, 335, 341, 355, 361/361, 366

[56] References Cited

FOREIGN PATENT DOCUMENTS 0015225 9/1980 European Pat. Off. ............ 361/333
2646617 4/1978 Fed. Rep. of Germany .

OTHER PUBLICATIONS

Patents Abstracts of Japan, vol. 2, No. 120, Oct. 6, 1978, p. 6929 E 78; & JP-A 53 85353.
Brown Boveri Review, vol. 65, No. 4, Apr. 1978, pp. 220–230, Baden, CH; G. Mauthe et al.

*Primary Examiner*—A. D. Pellinen
*Assistant Examiner*—Greg Thompson
*Attorney, Agent, or Firm*—Parkhurst & Oliff

[57] ABSTRACT

A metallic three-phase substation has three circuit breaker per two feeders, and includes two busbars (B01, B02) to which a plurality of single-phase cells (14R, 16R, 18R, 14S, 16S, 18S, 14T, 16T, 18T) with separate phases are connected. The cells are provided with circuit breakers (20R, 22R, 24R, 20S, 22S, 24S, 20T, 22T, 24T) which are aligned longitudinally according to a direction parallel to the busbars (B01, B02) and which are housed in vertical enclosures, located at regular intervals along the busbars. The lower and upper transverse connections of the circuit breakers extend respectively in two planes parallel to the bushbars (B01, B02).

10 Claims, 4 Drawing Sheets

Fig. 3
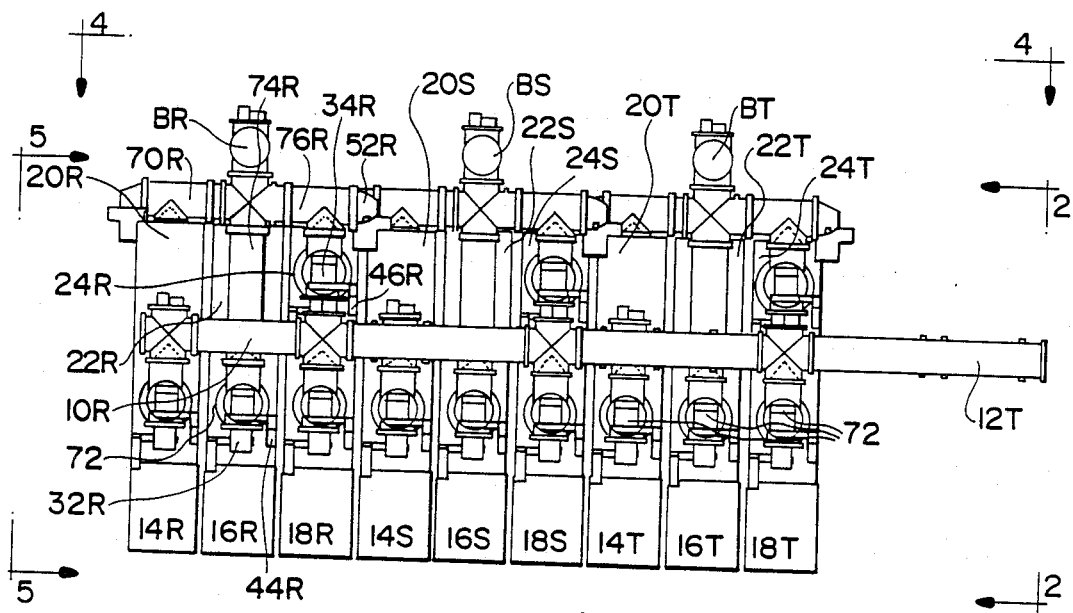
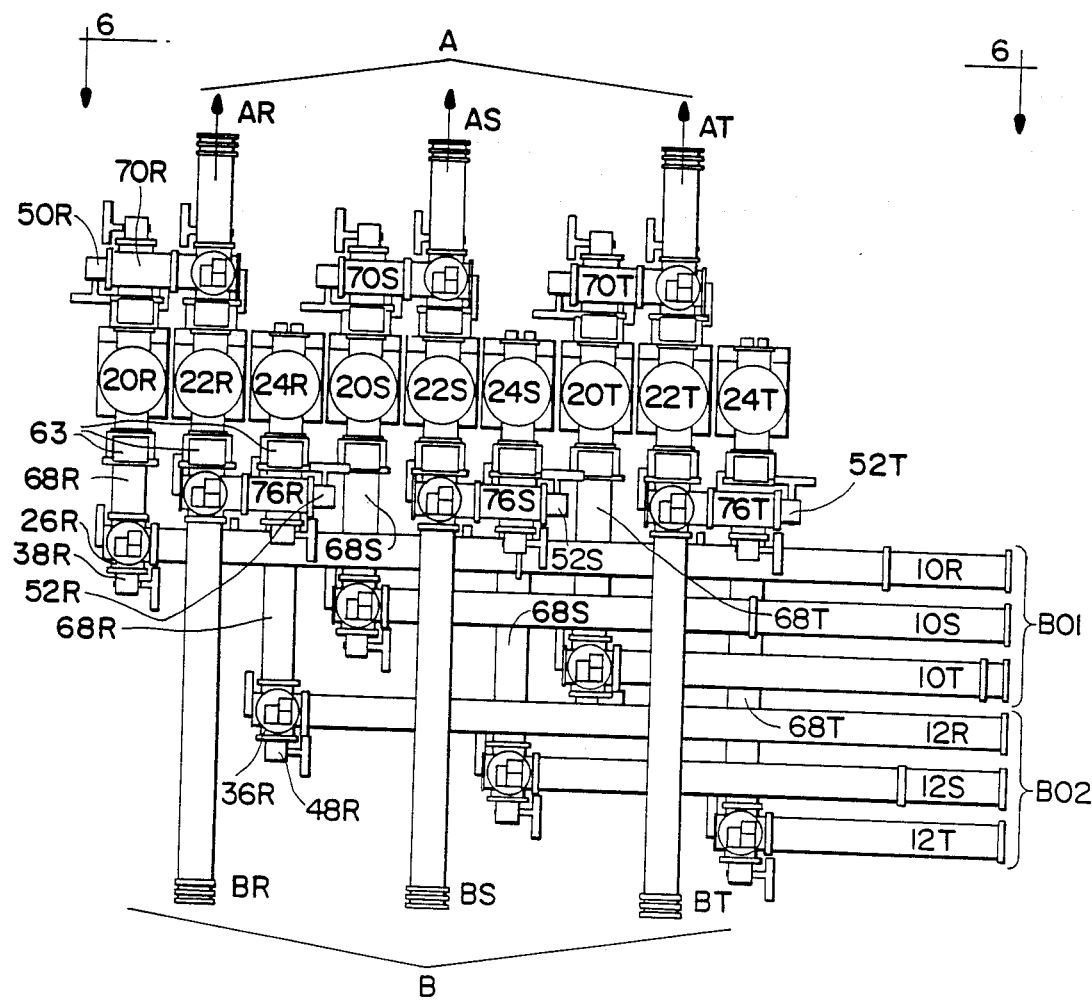
Fig. 4

HIGH VOLTAGE METALLIC SUBSTATION HAVING ONE AND A HALF CIRCUIT BREAKERS PER FEED

BACKGROUND AND SUMMARY OF THE INVENTION

The invention relates to a three-phase high voltage metallic substation having three circuit breakers per two feeders and active parts housed inside single-phase metallic enclosures earthed and filled with a high dielectric strength insulating gas, notably sulphur hexafluoride, and comprising:

a first and second parallel busbar, a plurality of single-phase cell-like cubicles with separate phases each containing a circuit breaker and disconnecting switches and earthing switches, each phase being fitted with a series of three juxtaposed cubicles electrically connected in series between the corresponding bars of the first and second busbars, a first feeder per phase cooperating with the intermediate cubicle and one of the cubicles connected to the first busbar, a second feeder per phase cooperating with said intermediate cubicle and the other cubicle associated with the second busbar.

According to a prior art metallic substation, described in German patent application No. 2,646,617, the circuit breakers of the different single-phase cubicles extend in a horizontal plane parallel to the two associated phase busbars. Each phase comprises a series of three juxtaposed circuit breakers located in the lower part of the substation. The busbars are located in the upper part of the substation above the feeders. Connection of the cubicles of the three phases required a special architecture which was achieved in various ways, for example, by longitudinal staggering of the series of three circuit breakers, by inclining the circuit breakers in relation to the busbars, by a triangular arrangement of the different busbar phases, or by distributing the circuit breakers over two different levels.

This architecture taught by the prior art is complicated to implement. Accordingly, an object of the present invention is to produce a substation with one and a half circuit breakers per feeder (or three circuit breakers for every two feeders) having an orderly structure, reduced overall dimensions and easy access to the various components.

The metallic substation according to the invention is characterized by the fact that all the separate phase cubicle circuit breakers are aligned longitudinally in a parallel direction to the busbars being housed in vertical enclosures located at regular intervals along the busbars, and that the lower and upper transverse connections of all the circuit breakers extend respectively in two planes parallel to the busbars.

The vertically arranged circuit breakers present two lateral connections, one upper and one lower, extending on the same side in the direction of the busbars (U-shaped circuit breaker) or in opposite directions (Z-shaped circuit breaker). All the elements which make up a cubicle are included in a transverse plane perpendicular to the busbars.

According to the preferred embodiment of the invention, the first and second circuit breakers of the cubicles of each phase present a Z-shaped structure with opposite transverse connections, whereas the third circuit breaker of each series has a U-shaped structure with transverse connections located on the busbar side. The two feeder systems are housed in the same horizontal plane parallel to that of the busbars and superposed on the cubicles, both feeders of a phase being aligned in a transverse direction and oriented in opposite directions on either side of the intermediate circuit breaker of each series of cubicles. In this case, the order of succession of the type of circuit breakers is ZZU, ZZU, ZZU.

The structure of the substation according to the invention lends itself to extension by simply extending the busbars and adding new cubicles. The busbars may be associated or separate phase extending in a common horizontal plane disposed between the two parallel planes of the lower connections of the circuit breakers.

According to an alternative embodiment, the two busbars are arranged in two parallel horizontal planes, the two bars of any one phase being superposed.

According to another alternative embodiment, the architecture of the substation can be modified in terms of the lay-out of the feeders. The feeders per phase can be located on the same side of the circuit breakers, and on the opposite side from the busbars by a simple modification to the order of succession of the type of circuit breakers, notably ZUZ, ZUZ, ZUZ.

DESCRIPTION OF THE DRAWINGS

Other advantages and characteristics will become more clearly apparent from the following description of various embodiments of the invention, given as examples only and represented in the accompanying drawings, in which:

FIG. 3 is a respective elevation view of FIG. 2.

FIG. 4 is a top view of FIG. 3 taken along line 4—4 of FIG. 3.

DESCRIPTION OF THE PREFERRED EMBODIMENTS

Figure 1:
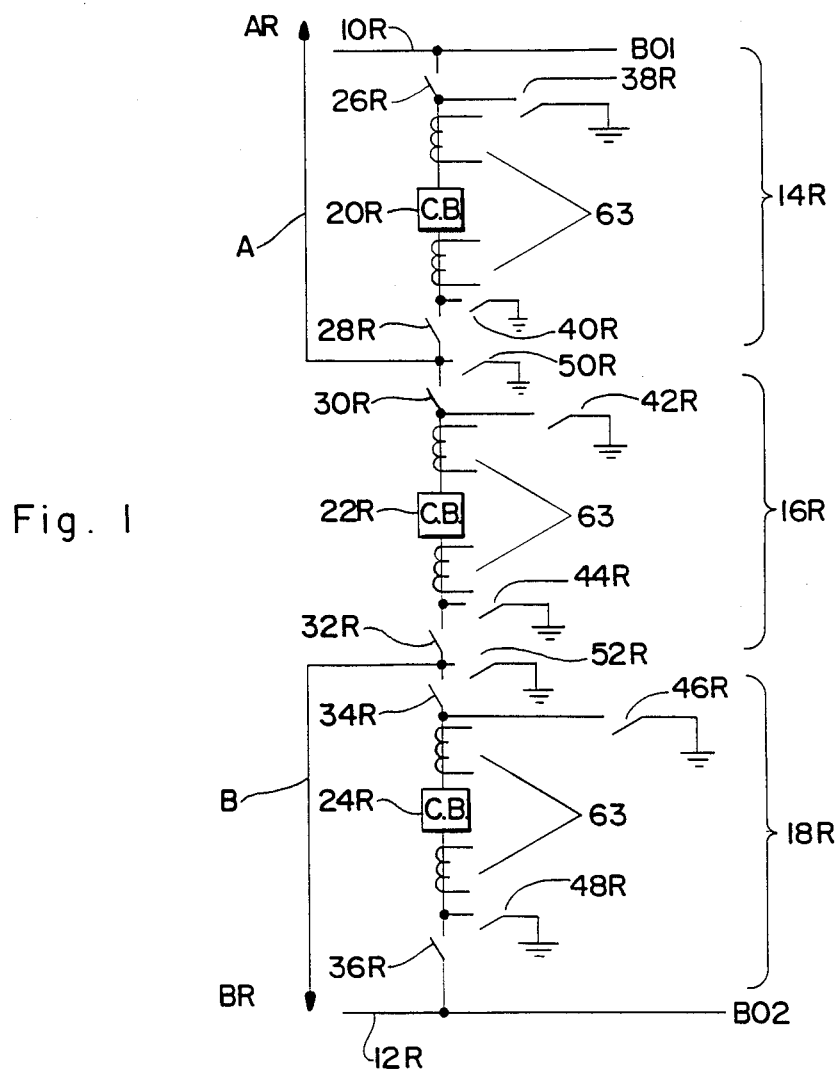
FIG. 1 shows the single-pole electrical diagram of a substation with one and a half circuit breakers per feeder.

FIG. 1 represents the single-pole electrical diagram of a three-phase electrical switchgear installation constituting a high voltage metallic substation, having three circuit breakers per two feeders. The substation has two three-phase feeder systems A, B and two busbars B01, B02 with three-phase bars 10R, 10S, 10T; 12R, 12S, 12T (see FIGS. 3 and 4) to supply a plurality of juxtaposed cubicles of single-phase type 14R, 16R, 18R, 14S, 16S, 18S, 14T, 16T and 18T, electrically grouped in series of three in each phase R, S, T.

Phase R, illustrated in FIG. 1, has three cubicles 14R, 16R, 18R connected in series between the bars 10R and 12R of busbars B01, B02, each cubicle 14R, 16R, 18R containing in classic fashion a circuit breaker 20R, 22R, 24R, two disconnecting switches 26R, 28R; 30R, 32R; 34R, 36R and two grounding switches 38R, 40R; 42R, 44R; 46R, 48R. The two cubicles 14R, 18R, which flank the intermediate cubicle 16R, are connected on one side to the bars 10R, 12R of the busbars B01, B02, and on the other side to two feeders AR, BR of the same phase R. Each feeder AR, BR of phase R has a grounding switch 50R, 52R and possibly a feeder disconnector (not shown) associated with it.

Phase S similarly comprises a series coupling of three single-phase cubicles 14S, 16S, 18S supplied by the bars 10S, 12S of the busbars B01, B02, and associated with the two feeders AS, BS.

Phase T of the substation comprises a series coupling of three other single-phase cubicles 14T, 16T, 18T supplied by the bars 10T, 12T of the busbars B01, B02, and associated with the two feeders AT, BT.

In normal operation of the substation with three circuit breakers per two feeders, the circuit breakers and disconnecting switches of all the cubicles 14R to 18T (i.e. 14R, 16R, 18R, 14S, 16S, 18S, 14T, 16T and 18T) are closed and the two feeder systems A, B are supplied by the two busbars B01, B02. When a fault occurs on a feeder, for example on feeder A, the latter is isolated by opening of the circuit breakers (20R, 22R, 20S, 20T and 22T) and disconnecting switches (26R, 28R, 30R, 32R, 26S, 28S, 30S, 32S, 26T, 28T, 30T and 32T) of the cubicles 14R, 16R, 16S, 14T and 16T. Feeder B remains supplied by busbar B02. When a fault occurs on one of the busbars, for example busbar B01, the circuit breakers (20R, 20S and 20T) and disconnecting switches (26R, 28R, 26S, 28S, 26T and 28T) of the three cubicles 14R, 14S, 14T are open and the two feeders A, B remain supplied by the other busbar B02.

In FIGS. 2 to 6, the three-phase substation is produced using single-phase enclosures, the different bars 10R, 10S, 10T; 12R, 12S, 12T of the two busbars B01, B02, and the elements of the cubicles 14R to 18T, in this case the circuit breakers and disconnecting switches of each phase R, S, T, being housed in separate metallic enclosures, filled with a high dielectric strength gas, notably sulphur hexafluoride, to ensure isolation. The cylindrical-shaped enclosures are earthed and divided into compartments to limit damage in the event of a fault or gas leak. The enclosures of the six bars 10R, 10S, 10T, 12R, 12S, 12T of the two busbars B01, B02 extend parallel side by side in the same horizontal plane. The busbars B01, B02 are of the associated phase type, the order of succession of the phases being RST, RST. The circuit breakers 20R, 22R, 24R, 20S, 22S, 24S, 20T, 22T and 24T (i.e. 20R, 22R, 24R, 20S, 22S, 24S, 20T, 22T and 24T) of the cubicles 14R to 18T are aligned and disposed vertically side by side in planes perpendicular to the busbars B01, B02 being located at regular intervals along the latter. The order of succession of the poles of the circuit breakers 20R to 24T is of the separate phase type RRR, SSS, TTT and all the circuit breakers 20R to 24T are located on the same side of the busbars B01, B02.

Two types of circuit breakers are used in the cubicles 14R to 18T constituting the architecture of the metallic substation:

a first Z-shaped type (see FIG. 5) comprises two diametrically opposed connecting flanges 60, 62 at different heights. All the circuit breakers 20R, 22R; 20S, 22S; 20T, 22T assigned to the cubicles 14R, 14S, 14T connected to the first busbar B01, and to the intermediate cubicles 16R, 16S, 16T, present an identical Z-shaped structure with opposite outputs and inputs. The enclosure of a single-phase current transformer 63 is connected to each lateral flange 60, 62, flange 62 being situated opposite the busbars B01, B02.

a second U-shaped type (see FIG. 2) is fitted with two connecting flanges 64, 66 located on the same side of the busbars B01, B02 at different heights. The three circuit breakers 24R, 24S, 24T of the cubicles 18R, 18S, 18T connected to the second busbar B02 have an identical U-shaped structure with outputs on the same side as the inputs. The enclosure of a single-phase current transformer 63 is connected to each lateral flange 64, 66. The structure of the active parts of a U-shaped circuit breaker and of a Z-shaped circuit breaker is identical, only the diametrical position of the upper connecting flanges 62 and 66 changes.

Figure 5:
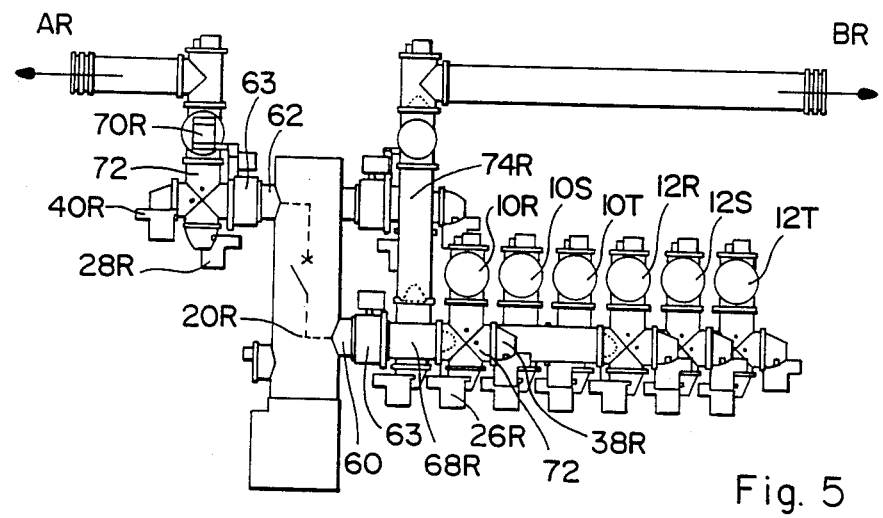
FIG. 5 is a left-hand side view taken along line 5—5 of FIG. 3.
Figure 6:
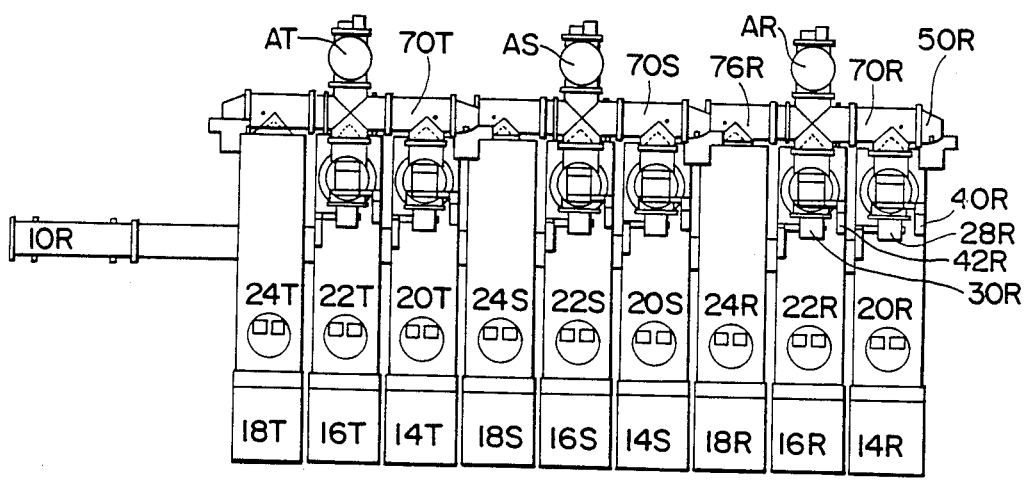
FIG. 6 is a top view of FIG. 4 taken along line 6—6 of FIG. 4.

The end cubicle 14R located in the left-hand part of the substation in FIGS. 3 and 4, comprises a single-phase Z-shaped circuit breaker 20R whose lower transverse connection, associated with the flange 60, is fitted with a current transformer 63 and a disconnecting switch 26R and grounding switch 38R assembly, said assembly being housed in the same standard enclosure 72, connected to the bar 10R belonging to phase R of the first busbar B01 (see FIG. 5). The current transformer 63 is connected to the enclosure 72 of the switches 26R, 38R by a transverse intermediate section 68R, located at a lower level than the horizontal plane of the housing of the bars 10R to 12T.

The upper connection associated with the flange 62 of the circuit breaker 20R comprises a current transformer 63 adjacent to the common disconnecting switch 28R and earthing switch 40R enclosure 72. The enclosure 72 is connected to the first feeder AR of phase R by a longitudinal intermediate section 70R acting as a housing for the grounding switch 50R of the feeder AR. The upper connecting section 70R extends in the direction of alignment of the cubicles being orthogonal to the transverse section 68R of the lower connection. The length of the section 70R corresponds closely to the diameter of the circuit breaker 20R enclosure. The horizontal plane of the bars 10R to 12T is situated at an intermediate level between the lower flange 60 and the upper flange 62 of the circuit breaker 20R.

The first transverse feeder AR is orthogonal to the section 70R and extends from the juxtaposed cubicle 16R in a horizontal plane situated above the cubicles, on the opposite side from the busbars B01, B02. The first feeder AR is also connected to the upper flange 62 of the Z-shaped circuit breaker 22R of the cubicle 16R by the common disconnecting switch 30R and grounding switch 42R in enclosure 72 (FIG. 6) and by a current transformer. The lower flange 60 of the circuit breaker 22R is connected to the second feeder BR of phase R by a current transformer 63, the common disconnecting switch 32R and grounding switch 44R in enclosure 72, and a vertical connecting section 74R (see FIGS. 3 and 5). The second transverse feeder BR is oriented on the busbar B01, B02 side, and above the busbars B01 and B02.

Figure 2:
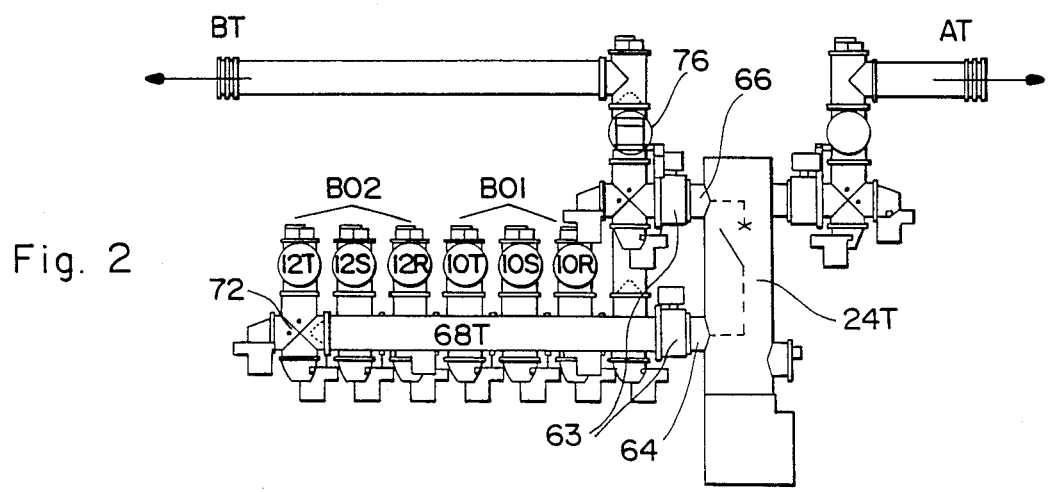
FIG. 2 is a right-hand side view of FIG. 3 taken along line 2—2 of the substation according to the invention.

The two feeders AR and BR of phase R are aligned and oriented in opposite directions following a transverse direction contained in the vertical mid-plane of the intermediate circuit breaker 22R (see FIGS. 2, 4 and 5).

The second feeder BR of phase R is connected to the upper flange 66 of the U-shaped circuit breaker 24R of the cubicle 18R by a longitudinal intermediate section 76R, the common disconnecting switch 34R and grounding switch 46R in enclosure 72, and a current transformer 63. The lower flange 64 of the U-shaped circuit breaker 24R is connected to the bar 12R of the second busbar B02 by a current transformer 63, a transverse intermediate section 68R and the common disconnecting switch 36R and grounding switch 48R in enclosure 72. The section 76R is identical to the section 70R and acts as a housing for the grounding switch 52R of the second feeder BR.

The two transverse section 68R connecting the circuit breakers 20R and 24R of phase R to the respective bars 10R and 12R of the busbars B01, B02 have different lengths depending on the distance between the bars 10R, 12R.

The architecture of the three cubicles 14S, 16S, 18S associated with phase S is identical to that described above for phase R, and their elements or parts will bear the same numbers followed by the letter S. The same applies to the three cubicles 14T, 16T, 18T of phase T.

In FIGS. 2 to 6, it can be noted that the two three-phase feeder systems A, B are located in a common horizontal plane superposed in relation to the cubicles 14R to 18T. The three parallel feeders BR, BS, BT of the second system B extend orthogonally above the bars 10R to 12T, whereas the parallel feeders AR, AS, AT of the first system A are arranged on the opposite side of the cubicles.

The order of succession of the phases RST, RST of the two associated phase busbars B01, B02 of the embodiment in FIGS. 2 to 6 may of course be modified so as to obtain a separated phase system RR, SS, TT. The architecture of the substation cubicles remains the same, apart from the adaptation of the lengths of the sections 68R, 68S, 68T connecting the circuit breakers 20R, 24R; 20S, 24S; 20T, 24T to the corresponding bars 10R, 12R; 10S, 12S; 10T, 12T.

Figure 7:
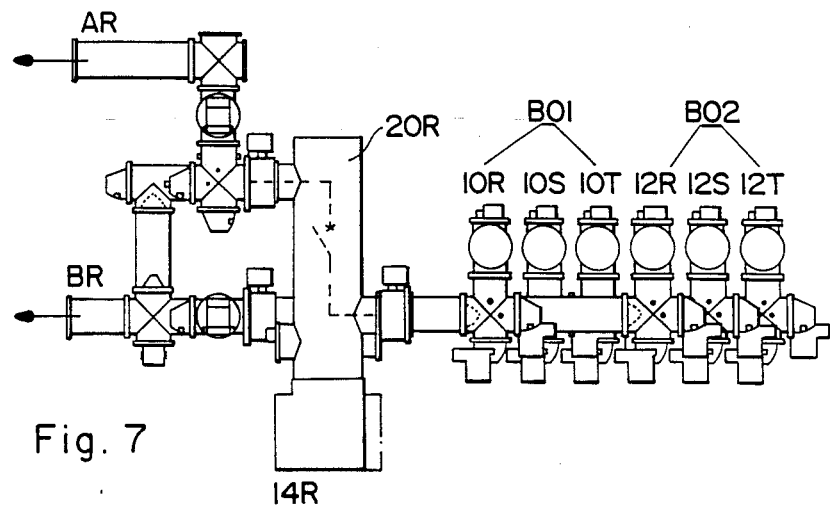
FIG. 7 shows an alternative embodiment of the substation according to the invention.
Figure 8:
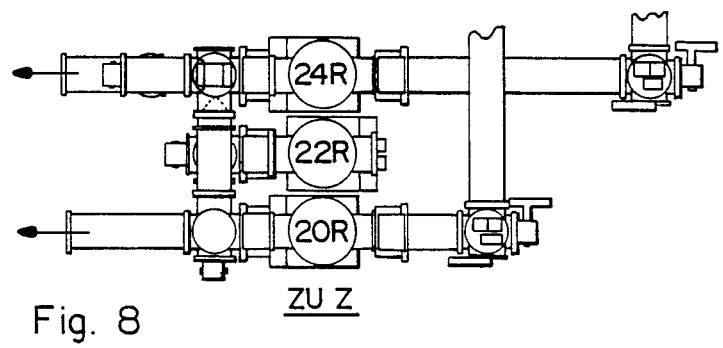
FIG. 8 is a plan view of FIG. 7.

According to the alternative embodiment illustrated in FIGS. 7 and 8, the two feeders of any one phase are located on the same side of the circuit breakers, on the opposite side from the busbars B01, B02. Only phase R has been represented for greater clarity. The circuit breakers 20R, 24R of the cubicles 14R and 18R are of the Z-shaped type, whereas the circuit breaker 22R of the intermediate cubicle 16R is of the U-shaped type. The order of succession of the type of circuit breakers 20R to 24T of the different separate phase cubicles 14R to 18T is ZUZ, ZUZ, ZUZ, whereas it was ZZU, ZZU, ZZU in the embodiment in FIGS. 2 to 6. The busbars B01, B02 are represented with associated phases, but can also be with separate phases. The two transverse feeders AR, BR of phase R are located respectively in the vertical plane of the Z-shaped circuit breakers 20R to 24R and are in the same direction but at different heights.

According to an alternative embodiment (not shown), the two feeders of the same phase extend on the busbar B01, B02, side. In this case, all the separate phase circuit breakers 20R to 24T are of the U-shaped type (FIG. 2).

Figure 9:
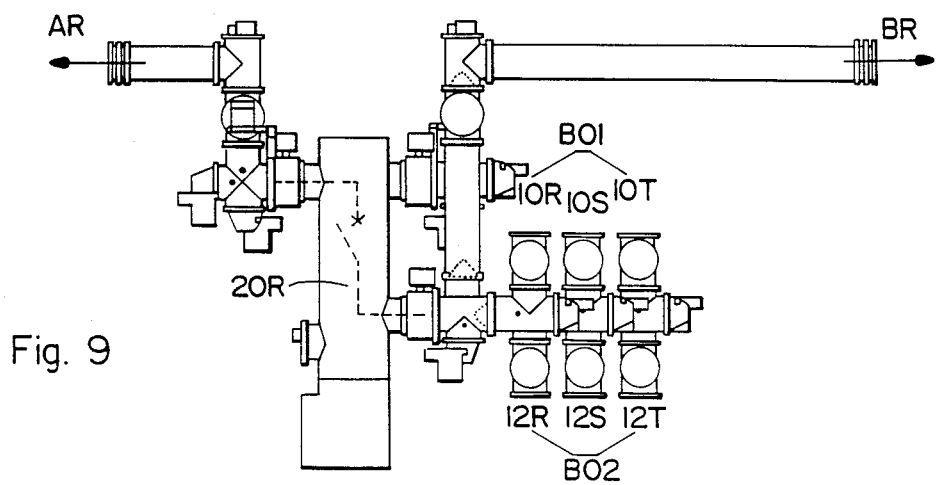
FIG. 9 is a left-hand side view of an alternative embodiment of the invention.

The device in FIG. 9 relates to an alternative embodiment with superposed busbars B01, B02. The architecture of the substation cubicles is similar to that of the device illustrated in FIGS. 2 to 6, the order of succession of the circuit breakers 20R to 24T of the different separate phase cubicles 14R to 18T being of the ZZU, ZZU, ZZU type. The location of the first busbar B01 remains unchanged, whereas the second busbar B02 is placed under the first busbar B01, the two bars 10R, 12R; 10S, 12S; 10T, 12T of any one phase being situated in a vertical plane extending parallel to the cubicles 14R to 18T. The sections 68R, 68S, 68T connecting the circuit breakers 20R, 24R; 20S, 24S; 20T, 24T of any one phase to the corresponding bars 10R, 12R; 10S, 12S; 10T, 12T are of identical length. The two busbars B01, B02 are fitted in two parallel horizontal planes, arranged on either side of the intermediate plane passing through the lower flanges 60, 64 of the circuit breakers 20R to 24T.

I claim:

1. A three phase high voltage metallic substation having three circuit breakers per two feeders and active parts housed inside single-phase metallic enclosures grounded and filled with an insulating gas with a high dielectric strength, notably sulphur hexafluoride, and comprising:

a first and a second parallel busbar, each of said first and second busbars including a plurality of three-phase conducting bars;

a first set of single-phase cubicles connected to said first busbar, a second set of single-phase cubicles connected to said second busbar and an intermediate set of single-phase cubicles connected between said first and said second sets of single-phase cubicles, each of said single-phase cubicles including a circuit breaker and disconnecting and grounding switches, each phase being fitted with a series of three juxtaposed cubicles electrically connected in series between corresponding three-phase conducting bars of the first and second busbars;

a first feeder per phase cooperating with said intermediate set of cubicles and said first set of cubicles connected to the first busbar; and a second feeder per phase cooperating with said intermediate set of cubicles and the second set of cubicles associated with the second busbar, wherein all the circuit breakers of each of the first, second and intermediate sets of single-phase cubicles are longitudinally aligned in a direction parallel to the first and second busbars and are housed in vertical enclosures located at regular intervals along the first and second busbars, the circuit breakers having lower and upper transverse connections extending respectively in two planes parallel to the first and second busbars.

2. A metallic substation according to claim 1, wherein the first and second busbars have an associated phase layout extending longitudinally in a common horizontal plane disposed between said lower and upper connections of the circuit breakers.

3. A metallic substation according to claim 1, wherein the first and second busbars are arranged in two parallel horizontal planes situated on either side of an intermediate plane passing through the lower connections of the circuit breakers, the three-phase conducting bars of any one phase being superposed.

4. A metallic substation according to claim 1, wherein the circuit breakers of said first and said intermediate sets of single-phase cubicles present a Z-shaped structure with opposite transverse connections, whereas the circuit breaker of said second set of single-phase cubicles has a U-shaped structure with transverse connections located on a same side of said first and second busbars said first and second feeders being housed in a horizontal plane parallel to that of the first and second busbars and superposed on the single-phase cubicles.

5. A metallic substation according to claim 4, wherein the lower connections of the circuit breakers of said first and said second sets of single-phase cubicles are connected to the said first and second busbars by a pair of transverse intermediate sections having lengths depending on the distance between the three-phase conducting bars of any one phase.

6. A metallic substation according to claim 5, wherein said intermediate sections of the lower connections of the circuit breakers of said first and said second sets of single-phase cubicles are connected to a common enclosure housing a respective one of said disconnecting switches and a respective one of said grounding switches.

7. A metallic substation according to claim 4, wherein the upper connections of the Z-shaped circuit structure of each phase is connected to a corresponding said first feeder by a first longitudinal intermediate section extending in a cubicle alignment direction, said first section acting as a housing for a grounding switch for a corresponding said first feeder.

8. A metallic substation according to claim 7, wherein the upper connections of the U-shaped circuit structure of each phase are connected to a corresponding said second feeder by a second longitudinal intermediate section extending parallel to said first section and on the opposite side of said circuit breakers, said second section acting as a housing for a grounding switch for said second feeder.

9. A metallic substation according to claim 1, wherein the circuit breakers of said first and said second sets of single-phase cubicles have a Z-shaped structure with opposite upper and lower transverse connections, whereas the circuit breaker of said intermediate set of single-phase cubicles has U-shaped structure with upper and lower transverse connections both situated opposite the first and second busbars, said first and second feeders of any one phase extending parallel on the same side of the circuit breakers at different heights, and on the opposite side of said circuit breakers from the first and second busbars.

10. A metallic substation according to claim 5, wherein the first and second feeders of any one phase are aligned in a transverse direction and oriented in opposite directions on either side of the circuit breaker of said intermediate set of single-phase cubicles.

* * * * *